United States Patent [19]
Ho

[11] Patent Number: 5,870,027
[45] Date of Patent: Feb. 9, 1999

[54] INDICATORS CLUSTER FOR COMPUTERS ON NETWORK

[76] Inventor: Ming-Chiao Ho, 10 Fl., No. 100, Min-Chyuan Rd., Hsin-Tien, Taipei Hsien, Taiwan

[21] Appl. No.: 964,880

[22] Filed: Nov. 5, 1997

[51] Int. Cl.$^6$ .................................................. G08B 23/00
[52] U.S. Cl. ........................... 340/693; 340/525; 361/683
[58] Field of Search ..................................... 340/540, 693, 340/691, 524, 525; 364/708.1; 361/681, 683–686; 439/928.1

[56] References Cited

U.S. PATENT DOCUMENTS

| | | | |
|---|---|---|---|
| 5,050,041 | 9/1991 | Shafi | 361/686 |
| 5,214,762 | 5/1993 | Bush et al. | 395/837 |
| 5,709,446 | 1/1998 | Kubota et al. | 362/30 |

*Primary Examiner*—Thomas J. Mullen, Jr.
*Attorney, Agent, or Firm*—Beveridge, DeGrandi, Weilacher & Young, LLP

[57] ABSTRACT

An indicator cluster includes a controlling substrate and a functional displaying module. The controlling substrate includes a set of five RJ-45 or USB connectors at its rear end, a fixing tab at its rear end, an input connector for +5V power supply, a pair of retaining holes, and connecting pins at its front end. A functional displaying module includes a pair of fastening clips at respective ends of a front panel. The front panel is also provided with a plurality of indicators. A rear end of a long portion of the functional displaying module is provided with connecting pins that correspond to the connecting pins of the controlling substrate. By the configuration described above, the controlling substrate can be readily mounted on to a mounting slot of a computer. Alternatively, it can be also fixedly mounted onto the supporting cartridge for a hard disk drive utilizing the pair of retaining holes. The controlling substrate is electrically connected to the built-in power supply of the computer housing with a conductive wire. The functional displaying module is fixedly attached to a mounting slot for a 3.5" hard disk drive or to a supporting bracket for mounting on to a mounting bracket for a CD-ROM. Accordingly, the indicator cluster is integrally combined with the computer housing.

3 Claims, 4 Drawing Sheets

INDICATORS CLUSTER FOR COMPUTERS ON NETWORK

FIELD OF THE INVENTION

The present invention relates to a built-in indicator cluster, more particularly, to an indicator cluster that includes a controlling substrate and a functional displaying module that are electrically connected with each other by means of bus lines. The controlling substrate is provided with a fixing tab at its rear end and/or a pair of retaining holes at a suitable position. The controlling substrate can be suitably disposed within the computer housing using the fixing tab or retaining holes. The functional displaying module can be fixedly attached to the mounting slot for a 3.5" hard disk drive by means of a pair of clips disposed at both sides. The functional displaying module can be also mounted onto a mounting bracket for a CD-ROM. By this arrangement, the production can be simplified, the casing for the indicator cluster can be eliminated, and the excess power can be reduced. The inner space of the computer can be effectively used.

DESCRIPTION OF PRIOR ART

The existing indicator cluster for a plurality of computers that are connected to a network is externally mounted. As shown in FIG. 1, the connection between workstations is generally described. The indicator cluster A includes at least five RJ-45 or USB connectors A1~A5. A connecting bus line B having connectors at both ends is applied to connect the indicator cluster A to workstations C1~C4, and the network server D. By this arrangement, the signal/data transmission between the workstations and the server D can be suitably communicated through the indicator cluster A.

This externally mounted indicator cluster A is characterized by the following features.

1. The indicator cluster includes a casing in which the controlling substrate is mounted and protected. The operational functions can be also suitably displayed.

2. The operating power is individually supplied. The casing can be placed onto the desk similar to the modem or other add-on controlling card. However, if space on the desk is not available, then it shall be placed on the ground. Not only will it be difficult to position the indicator cluster, but the casing also will become an obstacle when the table is moved. Further, the indicator cluster A can be readily damaged by shocks or vibration.

Furthermore, as the existing indicator cluster is externally connected, the maker needs to use a special design to arrange the controlling substrate, input/output ports and the power supply. This would no doubt increase the manufacturing cost. This cost will be shared by the end user and both suffer from this undesired cost. Accordingly, there is a lot of room for improvement.

SUMMARY OF THE INVENTION

It is the objective of this invention to provide the indicator cluster with which the problems encountered by the conventional indicator cluster can be completely solved.

It is a further objective of this invention to provide an indicator cluster in which the inner space within the computer housing can be effectively used.

DETAILED DESCRIPTION OF PREFERRED EMBODIMENT

Figure 1:
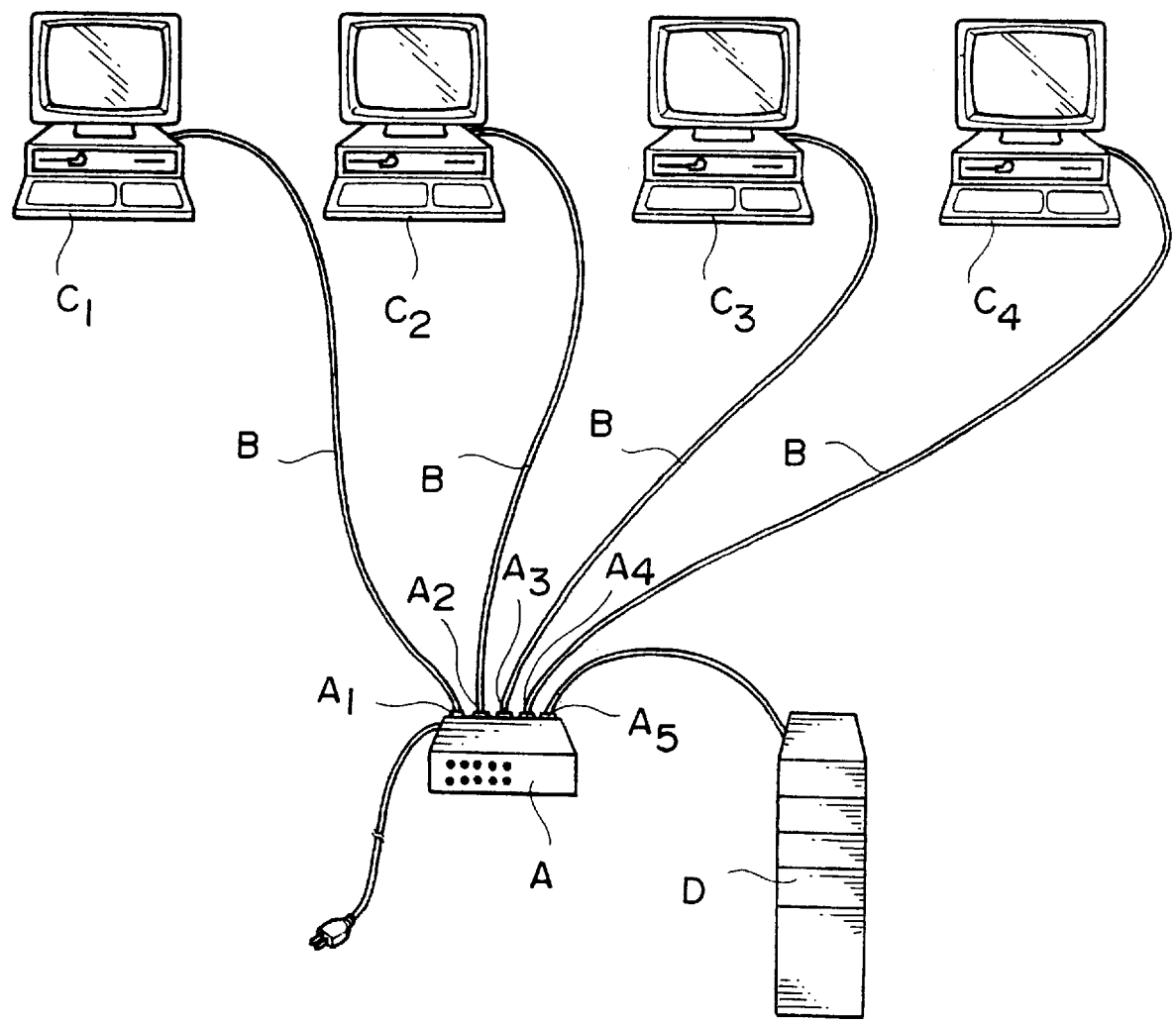
FIG. 1 is a schematic illustration of the conventional indicator cluster for computers connected to a network.
Figure 2:
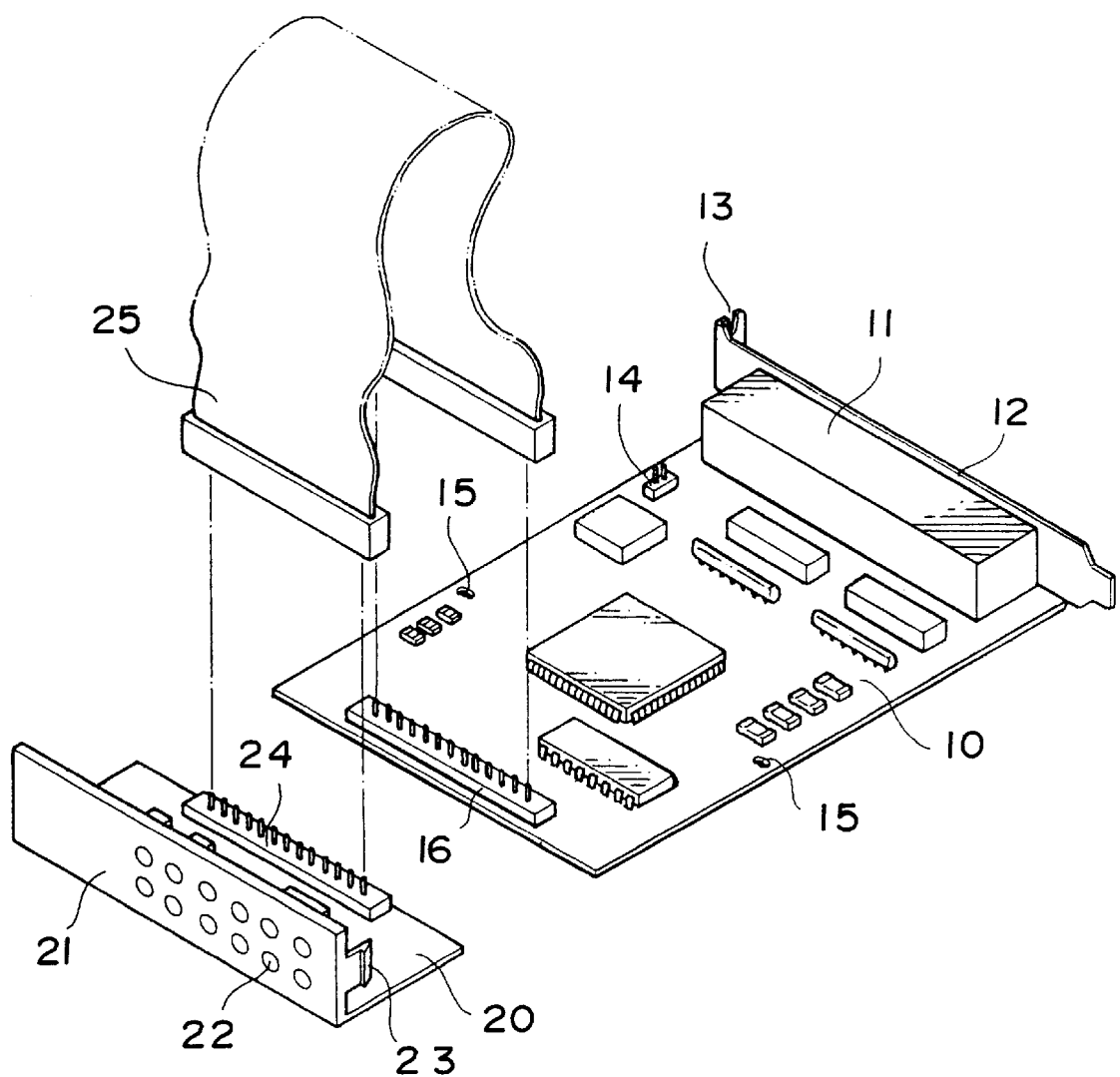
FIG. 2 is a perspective view of the indicator cluster made according to the present invention.
Figure 3:
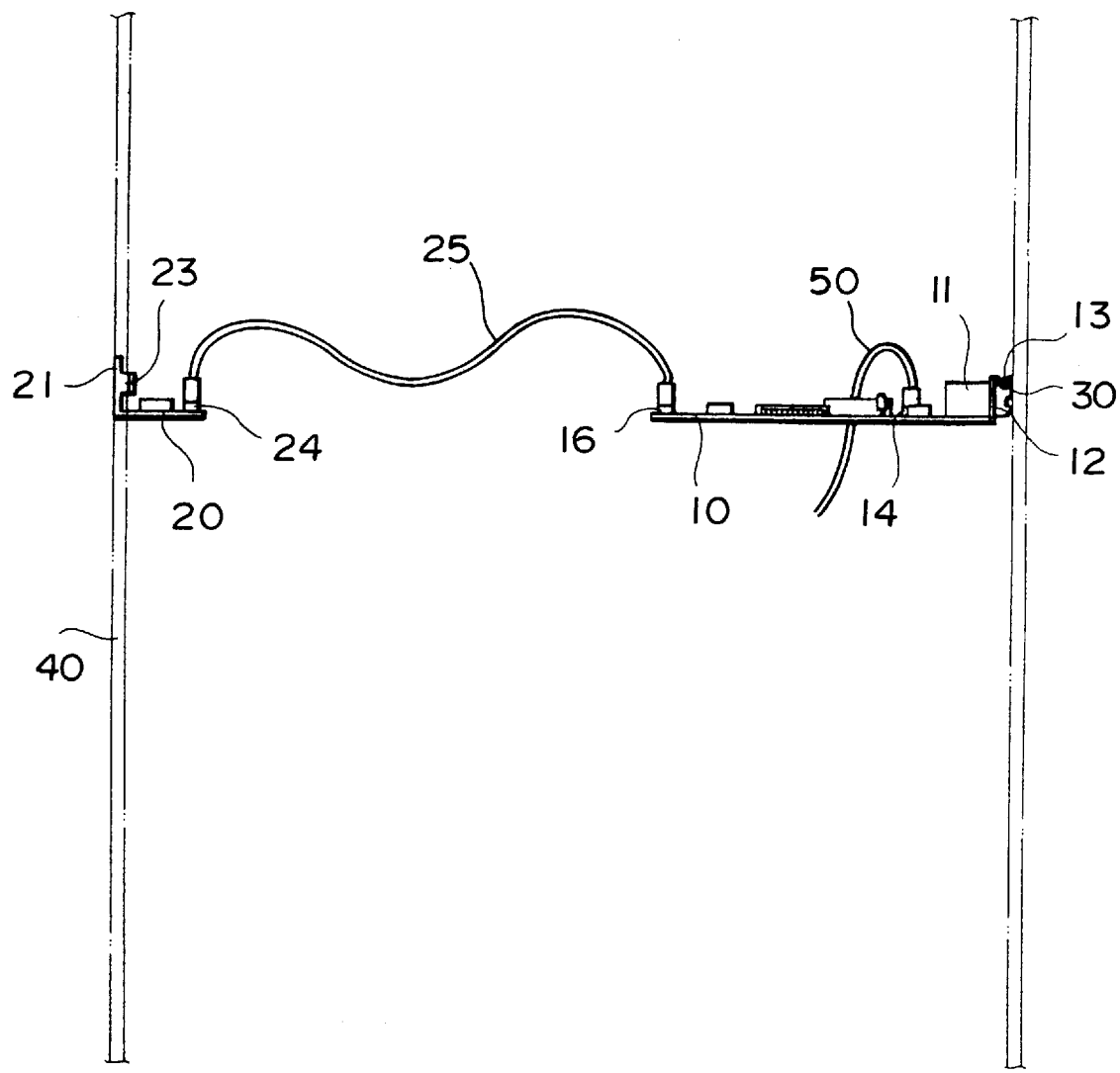
FIG. 3 is a schematic illustration in which the indicator cluster is mounted onto the computer.
Figure 4:
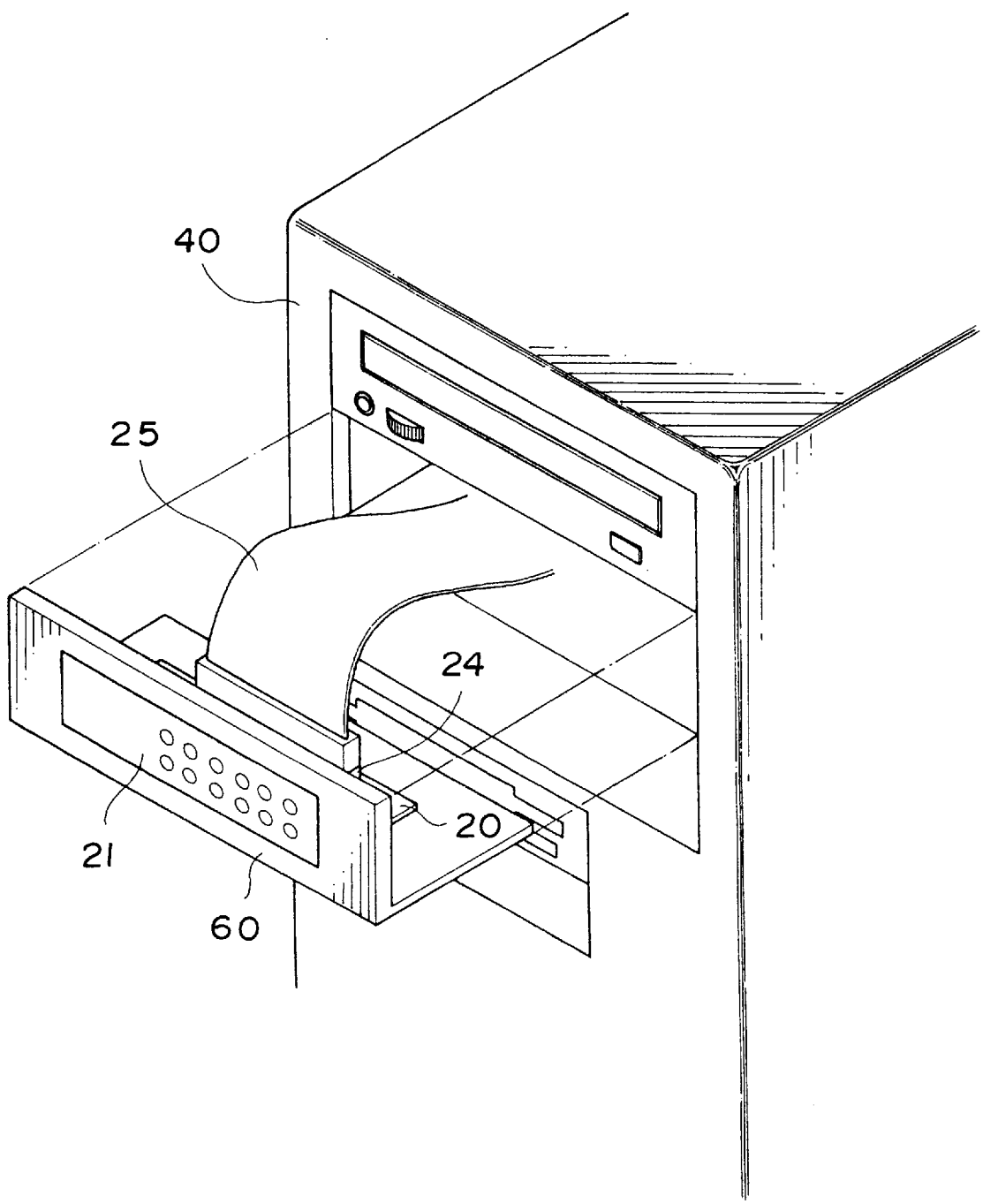
FIG. 4 is a schematic illustration view in which the indicator cluster is mounted onto a supporting bracket that can be mounted to a 148 mm supporting slot in a computer housing.

Referring to FIGS. 2 to 4, the indicator cluster made according to the present invention generally includes a controlling substrate 10 and a functional displaying module 20. Each of those components will be described in detail below.

The controlling substrate 10 includes a set of five RJ-45 or USB connectors 11 at its rear end. The controlling substrate 10 is further provided with a fixing or fastening tab 12. The fixing tab 12 includes an upright portion at one end having a cutoff 13. The controlling substrate 10 includes a plurality of electronic components and an input connector 14 for +5V power supply. The controlling substrate 10 further includes a pair of elliptical retaining holes 15. The front end of the controlling substrate 10 includes a set of connecting pins 16.

The functional displaying module 20 has a L-shape configuration that defines short and long portions, respectively. The short portion including a front panel 21 which has a width of 102 mm that is the standard width of a 3.5" hard disk drive. The front panel 21 is provided with a plurality of indicators 22 and a pair of fastening clips 23 is disposed at the respective ends of the panel. The rear end of the long portion is provided with a set of connecting pins 24 that correspond to the connecting pins 16 of the controlling substrate 10.

As shown in FIG. 3, the controlling substrate 10 can be fixedly attached to a mounting slot of the computer housing 40 by inserting the fastening tab 12 thereinto. A locking screw 30 is then applied to fix the controlling substrate 10 through the cutoff 13. Then a conducting wire having a power plug thereof can be applied to the power supply of the computer. By this arrangement, the controlling substrate 10 can be powered. In addition, the functional displaying module 20 can be fixedly attached to the mounting slot of the 3.5" hard disk drive. In an alternative, embodiment shown in FIG. 4 the functional displaying module 20 can be fixedly attached to a supporting bracket 60 that has a width of 148 mm that is a standard specification for a CD-ROM, a hard disk drive, etc. Then this supporting bracket 60 can be fixedly disposed within the mounting slot on the front panel of the housing 40. The connecting pins 24 of the functional displaying module 20 can be electrically connected to the connecting pins 16 of the controlling substrate 10. Then a complete loop is established.

If the controlling substrate 10 can not be attached by means of the fixing tab 12, it can be also fixedly attached by means of a pair of retaining holes 15 that are spaced apart about 95 mm that is also a standard specification. As a result, the controlling substrate 10 can still be fixedly attached to the mounting bracket or supporting cartridge for the 3.5" hard disk drive. Accordingly, the manufacturer does not need to design the controlling substrate 10. By this arrangement, the manufacturing process can be simplified by means of the modular design.

The present invention can be seen to have with the following advantages.

1. It can be readily appreciated that the fixing tab of the controlling substrate of the indicator cluster can be fixedly attached to the computer housing. The cost of the conventional indicator cluster casing that is externally connected can be therefore eliminated. The overall cost of the computer can be therefore lowered.

2. As the controlling substrate is fixedly mounted within the housing and the functional displaying module is attached on the front panel of the computer, it provides a better overall aesthetic appearance to the computer. It will be apparent that the indicator cluster is integrally built-in with the computer and no redundant space on the desk is required.

3. The controlling substrate 10 is provided with an input connector that can be electrically connected to the built-in power supply by means of connecting wires. By this arrangement, no excess power is required and the operational cost is therefore reduced. In addition, the power from the built-in power supply is more stable than the power directly from a wall receptacle.

4. When the indicator cluster is mounted within the of computer housing, its operation is independent with respect to the computer, i.e. it does not share the data/address bus ports on the motherboard of the computer. The operation of the indicator cluster has nothing to do with the computer. The only connection between the indicator cluster and the computer is that the indicator cluster is powered by the built-in power supply of the computer. Accordingly, the error or malfunction analysis of the indicator cluster is the same as that of the external indicator cluster.

5. The indicator cluster is an independent module and the end user may selectively buy it for reducing the cost. However, in case of necessity, the L-shape controlling substrate can be readily mounted within the standard mounting slot for the 3.5" hard disk drive. The user can conveniently do this and no excess space on the computer housing is required. In addition, the functional displaying module can be designed in a standard and independent manner. When a different controlling substrate is required, the module can be reconnected with the new controlling substrate. By the standardization of the functional displaying module, the overall cost of the indicator cluster can be therefore reduced.

6. Not only can the controlling substrate be fixedly attached by the fixing tab provided at the rear end of the controlling substrate, but it can also be fixedly attached to the supporting bracket for the 3.5" hard disk drive by means of a pair of retaining holes that are spaced apart 95 mm which is a standard specification. By this arrangement, even if a modification of the product is required, the controlling substrate does not need to be modified. As a result, the production can be simplified.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. An indicator cluster comprising:

a controlling substrate that includes a set of five RJ-45 or USB connectors at its rear end, said controlling substrate being further provided with a fixing tab at the rear end thereof, said fixing tab including an upright portion at one end having a cutoff, an input connector for +5V power supply, said controlling substrate further including a pair of retaining holes, the front end of said controlling substrate including a set of connecting pins; and a functional displaying module having an L-shape configuration that defines short and long portions, respectively, said module including a front panel that is provided with a plurality of indicators, a pair of fastening clips disposed at the respective ends of the panel, the rear end of said long portion provided with a set of connecting pins that correspond to said connecting pins of said controlling substrate.

2. An indicator cluster as recited in claim 1, wherein said front panel of said functional displaying module has a width of 102 mm.

3. An indicator cluster as recited in claim 1, wherein said retaining holes are spaced apart 95 mm.

* * * * *